April 11, 1950  O. OLSEN  2,503,507
MARLINESPIKE
Filed May 8, 1948
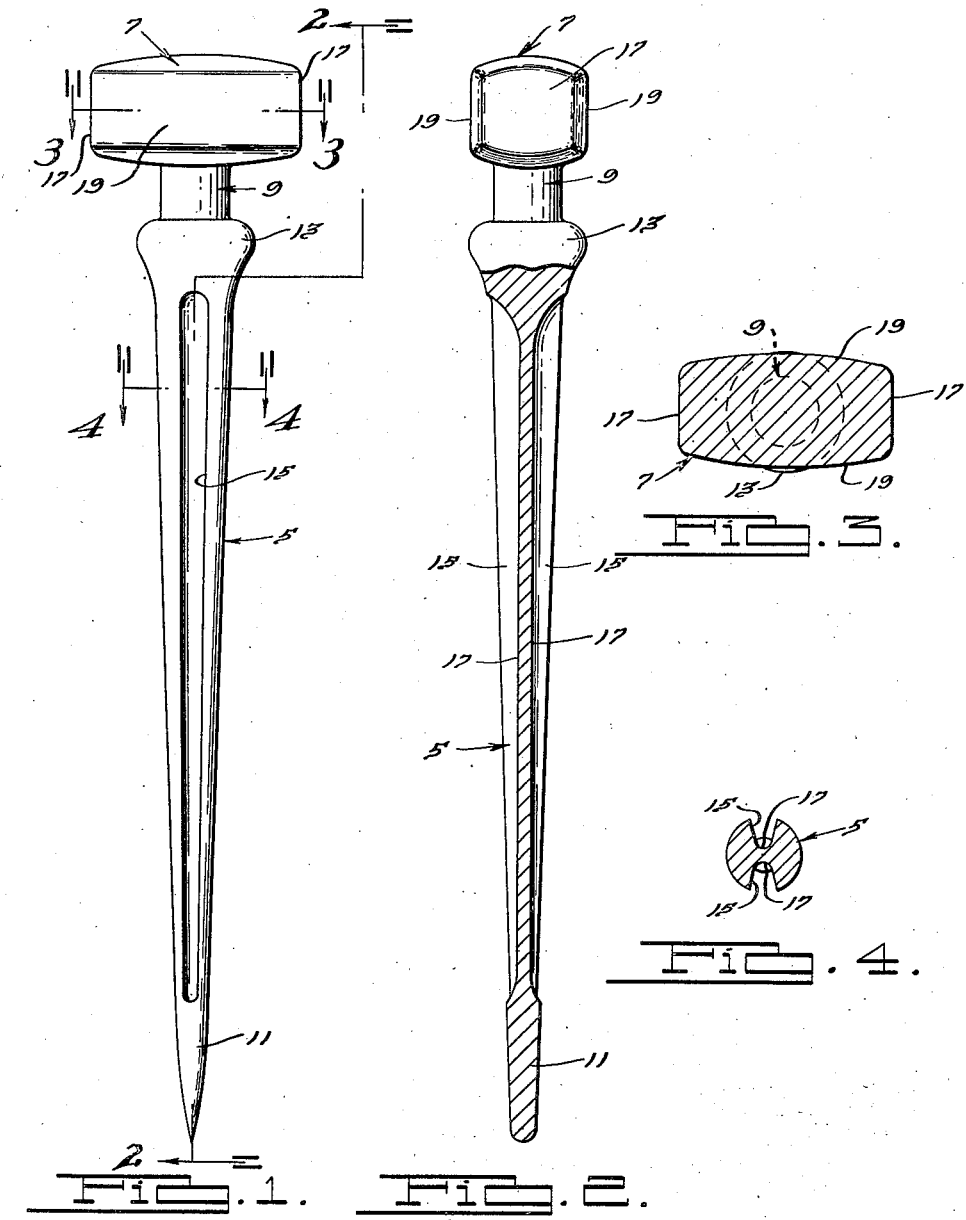
INVENTOR.
Otto Olsen.
BY
Harness, Dickey & Pierce.
ATTORNEYS.

Patented Apr. 11, 1950

2,503,507

UNITED STATES PATENT OFFICE 2,503,507

MARLINESPIKE

Otto Olsen, Detroit, Mich.

Application May 8, 1948, Serial No. 25,969

3 Claims. (Cl. 57—23)

This invention relates to improved marlinespikes for use in splicing cable, rope or the like.

The marlinespike of this invention is provided with a tapered body of circular cross section, having a flat point formed on one end thereof, and an enlarged head or shoulder formed on the opposite end thereof. The body is provided with a pair of oppositely disposed longitudinally extending grooves whose bottoms are substantially parallel to the axis of the spike body so that the grooves themselves taper, and are deeper at the upper or shouldered ends thereof than at the lower ends. Connected by means of a neck to the upper or shouldered end of the marlinespike body is a handle which is shaped so that it may be used both for manipulating the marlinespike body, and for use as a hammer head in flattening or compressing a cable joint after the same has been spliced by use of the body of the marlinespike.

Accordingly, the principal objects of this invention are to provide a marlinespike body having a pair of oppositely disposed longitudinally extending grooves which make said body of a substantially I-beam shape in cross section so as to thereby provide a spike which is light in weight, rugged in construction, and inexpensive to manufacture; to provide a marlinespike body having a pair of oppositely disposed longitudinally extending grooves which are deeper at the upper end of the spike than at the lower or pointed end thereof so that a cable strand, which is being laid, may be inserted into either groove, and so that even if the cable strand is large in diameter it will be fully received within a portion of either groove and can therefore be easily inserted through the strands which are separated by the spike body, a sufficient distance to permit a rugged and strong splice to be obtained; to provide a marlinespike having a handle on the upper end thereof which may be used both for manipulating the spike body, and as a hammer head for flattening or compressing spliced joints after the splicing operation has been completed; to provide a marlinespike which is easily manipulated and which due to the oppositely disposed grooves therein permits a cable to be spliced with a minimum amount of manipulation and in a minimum length of time.

These and other objects of this invention will become apparent from the following detailed description taken in conjunction with the accompanying drawing in which:

Figure 1 is a front elevational view of the marlinespike of this invention;

Fig. 2 is a view partially in elevation and partially in section taken along the line 2—2 of Fig. 1;

Fig. 3 is a transverse sectional view taken substantially along the line 3—3 of Fig. 1; and Fig. 4 is a transverse sectional view taken substantially along the line 4—4 of Fig. 1.

The marlinespike of this invention may be made of any suitable material but is preferably formed of metal and preferably forged as a single piece so as to have a body portion 5, a handle portion 7 at the upper end of the body, and a neck portion 9 connecting the handle and body.

The body 5 of the marlinespike is generally circular in cross section and tapers approximately uniformly from one end thereof toward the other end thereof so as to be smaller in diameter adjacent a flat point 11 formed on the outer end thereof. The flat point 11 is shaped so that it can be easily inserted between cable strands so as to permit the body 5 to be inserted between, and spread the strands. This permits a strand which is being laid to be inserted through the strand opening thus provided. The upper end of the body 5 is enlarged as by outward flaring to form a head or shoulder 13 which acts as a stop to prevent the body from being pushed completely through the opening formed between the spread cable strands. A pair of diametrically oppositely disposed longitudinally extending grooves 15 are formed in the body 5, which grooves terminate at one end adjacent the flat point 11 and at the opposite end in the head or shoulder 13. As best brought out in Fig. 4, the grooves in cross section are each provided with a circularly sectioned bottom which merges into outwardly divergent side walls.

As can be seen in Fig. 2, the bottom 17 of each of the grooves 15 extends substantially parallel to the axis of the body 5 so that, due to the taper of the body, the grooves are deeper and, because of the tapered side walls, wider adjacent the head 13 than adjacent the flat point 11. As a result, when the spike body 5 is inserted between the strands of a cable to be spliced, if the strands are especially large, the strand which is to be laid can be inserted from the handle end into the deep and wide end of either of the grooves 15 and will be fully received therein. The size of the cable strand which is being laid will determine the distance which the other strands must be separated and therefore will determine the amount of penetration of the spike body through the cable strands. If the strands are relatively large in diameter the spike body will be inserted a sufficient distance to provide a large enough opening between the strands to permit the strand which is to be laid to be easily pushed through the groove 15 in which it is received.

Due to the oppositely disposed grooves 15, the body has, as can be seen in Fig. 4, a generally I beam shape in cross section, so that it is light in weight and inexpensive to manufacture, because less metal is required than if only one groove were formed. Likewise, due to the I beam shape of the body, it is especially rugged in construction and structurally strong. The two grooves in the marlinespike body also simplify manipulation thereof and thus permit the splicing operation to be completed in less time than with any known marlinespike.

The neck 9 which joins the head end of the spike body 5 to the handle 7 is smaller in diameter than both the body head 13 and the handle 7, so that a loop of cord may be tied to it to permit the marlinespike to be carried easily on a waist belt or the like of the user, when it is not actually in use.

The handle 7, in the broader aspects of the invention, may be of any suitable shape which can be easily grasped by a user to manipulate the body portion properly. However, it is preferably elongated, and in accordance with a more limited phase of the invention is provided with substantially flat opposite transverse ends 17 providing striking surfaces so that the handle 7 may be used as a hammer head while and after a cable has been spliced. When the splice is being made and after it is completed, it is desirable to compact the joint to compress it and provide a strong connection. For this purpose, the flat ends 17 of the handle 7 may be used as the faces of a hammer head, with the body 5 of the spike forming the handle therefor. Additionally, the sides 19 of the head 7 are preferably flattened in a direction parallel to the axis of the marlinespike and slightly convexly curved in the direction of the length of the head to provide additional striking surfaces. These are especially useful, particularly in splicing wire cable, in smoothing out the splice after the latter has been made and compacted by the ends 17.

It will be appreciated from the above that in this case an end is provided for the marlinespike which serves a dual purpose, namely, both as a handle and as a hammer head, and in the latter role in view of its having both end and side striking faces, a dual purpose hammer head. Inasmuch as the end 7 is a unitary part of the marlinespike, it obviates the necessity of carrying a separate hammer for pounding the spliced joints. The upper and lower faces of the handle 7 can be formed with any suitable contour but preferably have a slightly arcuate contour so as to make the handle comfortable to hold and easy to manipulate.

It will thus be seen that a marlinespike is provided which is inexpensive to manufacture, light in weight, and durable and rugged in construction, and which has a handle on one end thereof which can be used as a hammer head. Likewise, it will be noted that, due to the oppositely disposed grooves formed in the spike body, manipulation thereof is made easier so that a splice may be more quickly and easily made.

I claim:

1. A marlinespike having a tapered body of circular cross section, a flat point formed on the small end of said body, and the opposite end of said body being enlarged to form a shoulder facing toward said flat point, said body having oppositely disposed longitudinally extending grooves formed therein terminating at one end adjacent said flat point and at the opposite end in said shoulder, and said grooves having their bottoms disposed substantially parallel to the axis of said body so as to be deeper at the shouldered end of said body than at the flat point end thereof.

2. A marlinespike having a tapered body of circular cross section, a point formed on the small end of said body, and the opposite end of said body being enlarged to form a shoulder facing toward said flat point, said body having oppositely disposed longitudinally extending grooves formed therein terminating at one end adjacent said flat point and at the opposite end in said shoulder, each of said grooves having a circular sectional bottom which merges into outwardly divergent side walls, and said grooves having their bottoms disposed substantially parallel to the axis of said body so as to be deeper at the shouldered end of said body than at the flat point end thereof.

3. A marlinespike having a tapered elongated body formed with a flat point at the small end thereof, said body having oppositely disposed longitudinal grooves formed therein, said grooves having their bottoms disposed substantially parallel to the axis of said body so as to be deeper at the end of the body remote from said flat point.

OTTO OLSEN.

REFERENCES CITED

The following references are of record in the file of this patent:

UNITED STATES PATENTS

| Number | Name | Date |
|---|---|---|
| 1,014,200 | Anderson | Jan. 9, 1912 |
| 1,121,927 | Klingler | Dec. 22, 1914 |
| 1,283,044 | Beasley | Oct. 29, 1918 |
| 1,540,790 | McCray | June 9, 1925 |
| 1,542,656 | Balod | June 16, 1925 |